US006950289B2

(12) United States Patent
Lam et al.

(10) Patent No.: US 6,950,289 B2
(45) Date of Patent: Sep. 27, 2005

(54) EMBEDDED LAPPING GUIDE FOR A MAGNETIC HEAD CLUSTER

(75) Inventors: Chuck Fai Lam, Kowloon (HK); Kenneth R. Martin, Palmer, MA (US); Charles A. Gibson, Clinton, MA (US)

(73) Assignee: Lafe Computer Magnetics Ltd., Hong Kong (HK)

( * ) Notice: Subject to any disclaimer, the term of this patent is extended or adjusted under 35 U.S.C. 154(b) by 274 days.

(21) Appl. No.: 10/097,294

(22) Filed: Mar. 14, 2002

(65) Prior Publication Data

US 2002/0173227 A1 Nov. 21, 2002

Related U.S. Application Data

(60) Provisional application No. 60/276,693, filed on Mar. 16, 2001.

(51) Int. Cl.$^7$ .............................. G11B 5/39; G11B 5/29
(52) U.S. Cl. ........................ 360/316; 360/121; 360/122
(58) Field of Search .............................. 360/121, 125, 360/126, 316, 317

(56) References Cited

U.S. PATENT DOCUMENTS

| | | | |
|---|---|---|---|
| 4,155,106 A | 5/1979 | Muraoka et al. ............ 360/112 |
| 5,588,199 A | 12/1996 | Krounbi et al. ............ 29/603.1 |
| 5,597,340 A | 1/1997 | Church et al. .................. 451/5 |
| 5,772,493 A | 6/1998 | Rottmayer et al. ............ 451/5 |
| 5,997,381 A | 12/1999 | Dee et al. ........................ 451/5 |
| 6,027,397 A | 2/2000 | Church et al. .................. 451/1 |
| 6,193,584 B1 | 2/2001 | Rudy et al. ..................... 451/5 |
| 6,330,488 B1 * | 12/2001 | Yoshida et al. ............. 700/177 |
| 6,347,983 B1 * | 2/2002 | Hao et al. ...................... 451/57 |
| 6,684,171 B2 * | 1/2004 | Church et al. .............. 702/104 |
| 6,699,102 B2 * | 3/2004 | Reiley et al. ................... 451/8 |

* cited by examiner

Primary Examiner—Jefferson Evans
(74) Attorney, Agent, or Firm—Sidley Austin Brown & Wood LLP

(57) ABSTRACT

A magnetic head cluster is provided along with a method of making a magnetic head cluster. The magnetic head cluster comprises a substrate having a plurality of magnetoresistive (MR) read and inductive magnetic write transducers and a plurality of terminals formed thereon. A plurality of lapping guides are also provided on the substrate between adjacent transducers.

20 Claims, 3 Drawing Sheets

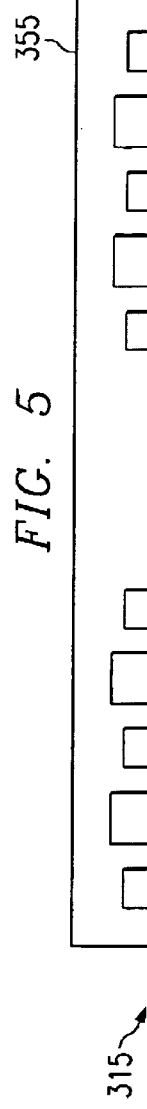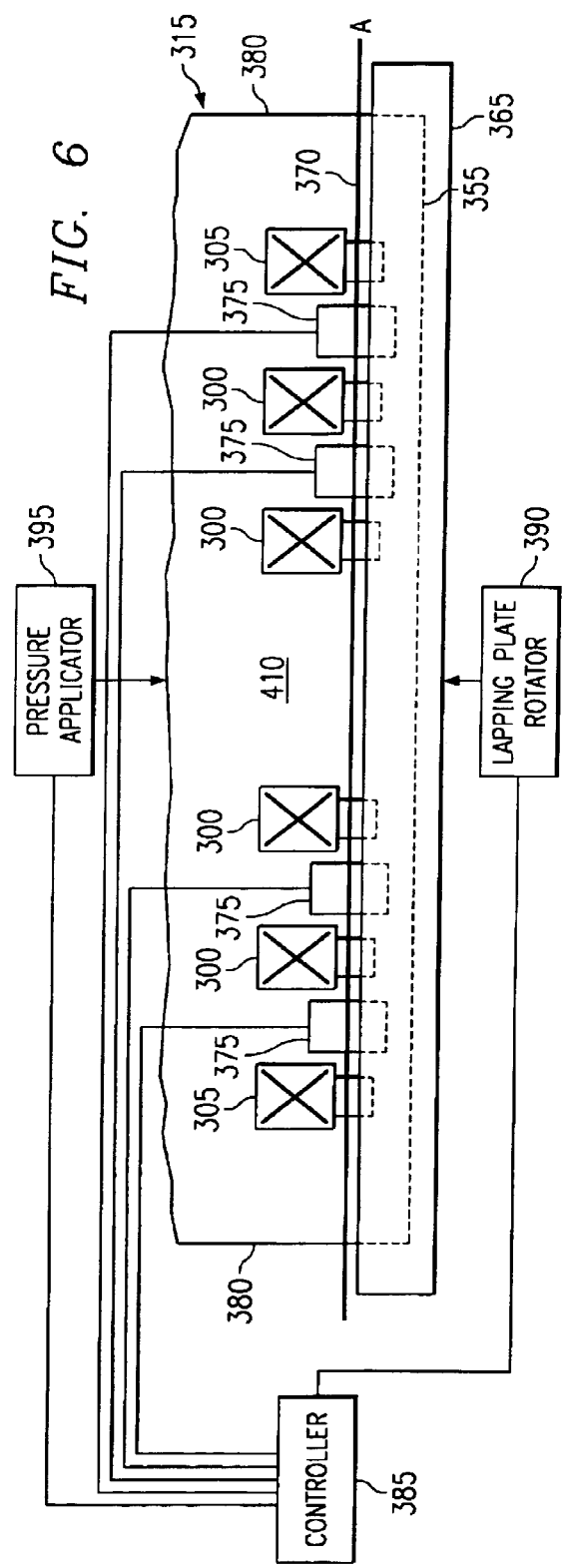

EMBEDDED LAPPING GUIDE FOR A MAGNETIC HEAD CLUSTER

This application claims the benefit of U.S. Provisional Application No. 60/276,693, filed on Mar. 16, 2001, the entire contents of which are hereby incorporated by reference.

FIELD OF THE INVENTION

The present invention relates to a magnetic head cluster for a data storage device having read/write transducers, which are used for communicating with a magnetic recording medium, and lapping guides, which are used during lapping processes while fabricating the magnetic head cluster. Further, the present invention relates to a method for making a magnetic head cluster.

BACKGROUND OF THE INVENTION

Thin film magnetoresistive (MR) read and inductive write transducers are widely used for magnetic heads in data storage devices, such as disk drives and linear tape drives. Various types of MR read heads are known in the art, including anisotropic magnetoresistive (AMR) read heads, giant magnetoresistive (GMR) read heads, and spin valve read heads. In typical magnetic tape read/write heads, multiple merged MR read/inductive write transducers are grouped into a single structure called a magnetic head cluster. Each of the transducers is typically aligned in the cluster along one edge, known as an air bearing surface (ABS) in disk drive technology and known as a tape bearing surface (TBS) for tape drives (for simplicity this surface will be referred to herein as a tape bearing surface), which faces a recording medium during normal read/write operation. In general, each transducer of a cluster provides an unique read/write channel.

The demand for data storage has been increasing in recent years and this demand has put pressure on fabrication processes for more efficient and cost effective methods and devices. In order to keep up with this demand, attempts to improve various aspects of magnetic head technology include increasing the sensitivity of the magnetic heads, reducing manufacturing costs, and simplifying manufacturing processes.

A conventional manufacturing process for fabricating a magnetic head cluster will be described next with reference to FIGS. 1 and 2. As shown in FIGS. 1 and 2, a magnetic head cluster 115 is made by forming a plurality of inner merged MR read/inductive write transducers 100 and outermost merged MR read/inductive write transducers 105, a plurality of electrical lapping guides 175, and a plurality of terminals 107 on a single wafer 110. The wafer 110 can be formed from any material which has high wear resistance, strength, fracture toughness, and good electrical conductivity, such as an alumina titanium-carbide ($Al_2O_3$/TiC) ceramic wafer. The processes used to form the transducers 100 and 105 on the wafer 110 typically include a combination of lithography, deposition (vacuum or plating), and etching steps, all of which are known in the art. The transducers 100 and 105 are grouped into the clusters 115, which are separated from one another by separation kerfs 120. As shown in FIG. 1, the clusters 115 are aligned in rows and columns defined by the separation kerfs 120. Once the process of forming the clusters 115 is complete, the wafer 110 is cut along the separation kerfs 120, dividing the wafer 110 into a plurality of clusters. This well-known process of cutting the wafer along the kerfs is commonly referred to as "dicing."

As mentioned above, the transducers 100 and 105 included in each cluster 115 are typically merged MR read/inductive write transducers. As shown in FIG. 3, a conventional MR read transducer 125 typically includes an MR stripe 130, which exhibits variations in resistance when exposed to a magnetic field. The stripe height SH of the MR stripe 130 must be controlled within a tight tolerance, such as within a few micro-inches, so that a sensed magnetic signal can generate an optimum change in a resistance of the MR stripe 130. The inductive write transducer 135 typically comprises various layers of poles 140 and insulating material 145, and also includes an electrical coil 150. The region of the inductive write transducer 135 closest to an upper edge 155 (shown on FIG. 2) of the cluster 115, where the two poles are separated only by a thin insulating layer, is typically called a throat 160. As will be explained later, the region closest to the upper edge 155 will eventually be lapped to form a tape bearing surface. As is known in the art, the throat height TH must also be controlled within a tight tolerance for the transducer to generate an optimum magnetic signal.

When the separation kerfs 120 are formed on the wafer 110, a slight amount of excess substrate is provided along the upper edge 155 of each cluster. The reason for providing this slight amount of excess substrate is that the dicing process is not precise enough to achieve the optimum stripe height SH and throat height TH for each transducer 100 and 105. So, rather than inadvertently cutting the stripe 130 or throat 160 too short while dicing the wafer 110, the stripe 130 and throat 160 are intentionally left too long and later are carefully shortened by a process known as lapping.

FIG. 4 shows an exaggerated view of the conventional lapping process in order to provide a clear illustration. The broken line in FIG. 4 represents a portion of the cluster 115 which has already been removed by the lapping process. In FIG. 4, a controller 185 operates to activate and halt a lapping plate rotator 190. The lapping plate rotator 190, when activated, causes a lapping plate 165 to rotate relative to the cluster 115, thereby grinding the upper edge 155. Eventually, a sufficient amount of upper edge 155 is ground away to form a tape bearing surface 170. The tape bearing surface 170 is a surface of the magnetic head cluster 115 which will face a recording medium (not shown) when the magnetic head cluster 115 is used for read/write operations. A lapping plate pressure applicator 195 also receives signals from the controller 185 for continuously adjusting the amount of pressure being applied to the cluster 115 during the lapping process. The lapping plate pressure applicator 195 may include, for example, one or more dual action air cylinders (not shown) for applying varying amounts of pressure to different points on the cluster 115 in order to provide for skew control. The controller 185 senses an electrical resistance of the electrical lapping guides 175, which changes as portions of the electrical lapping guides 175 adjoining the upper edge 155 are ground away. The lapping process is complete once the portions of the cluster 115 are removed up to line A, which indicates the desired position of the tape bearing surface 170 of the cluster 115.

During the lapping process, the excess portion of the substrate 210 is carefully ground away by introducing an abrasive material, such as a diamond slurry (not shown), between the rotating lapping plate 165 and the upper edge 155 of the fixed cluster 115. In order to provide for precise control during the lapping process, the electrical lapping guides 175 are typically provided between each outermost transducer 105 and a respective outer edge 180 of each cluster 115. Once the electrical lapping guides 175 reach a predetermined resistance, the controller 185 halts the motion of the lapping plate 165. Ideally, the predetermined resistance is selected so that the target stripe height SH and throat height TH are achieved.

In general, lapping guides and separation kerfs, which are useful during the manufacturing of magnetic head clusters, have no functional purpose during normal operation of a magnetic head cluster. As mentioned above, electrical lapping guides are typically provided between an outermost transducer and an outer edge of each cluster. Thus, the size of each cluster is larger than its functional size, which need only include transducers. Therefore, from a functional standpoint, the wafer space occupied by lapping guides and separation kerfs is wasted. Moreover, in order to minimize the unit cost per cluster, efficient use of wafer space is important. For this reason, recent efforts have been made to increase the efficiency with which wafer space is utilized by reducing the amount of wafer space used for lapping guides and separation kerfs. Accordingly, separation kerfs have been reduced to a very small size so that more clusters can be put onto the same wafer.

U.S. Pat. No. 6,027,397 discloses further efforts to efficiently utilize wafer space, wherein the cluster size is reduced by putting the lapping guides onto the separation kerfs. U.S. Pat. No. 5,588,199 discloses another attempt to efficiently utilize wafer space, wherein the number of transducers per wafer is increased by adding a resistor network, which is used as a lapping guide, inside the transducers. Therefore, there is no need for a separate electrical lapping guide. A similar approach can be found in U.S. Pat. No. 5,772,493 by using an external magnetic excitation field to the transducer and measuring the resistance of the MR element in response to variations in the applied magnetic excitation field.

Despite these past attempts to increase the efficiency with which wafer space is utilized, there continues to be a need to improve wafer utilization and simplify manufacturing processes.

BRIEF SUMMARY OF THE INVENTION

In view of the above shortcomings with the prior art, an object of the present invention is to provide a magnetic head cluster that includes lapping guides arranged in such a way so as to reduce cluster size allowing for more clusters per wafer.

Another object of the present invention is to provide a method of making a magnetic head cluster which allows for a reduced cluster size so that more clusters per wafer may be formed.

In order to achieve the above objects, a magnetic head cluster is provided that comprises a substrate having a surface with at least two transducer elements disposed thereon and at least one resistive element that is disposed between any two of the at least two transducer elements.

In accordance with another aspect of the present invention, a method of fabricating a magnetic head cluster having an edge portion is provided that comprises the steps of providing a substrate having a surface, forming at least two transducer elements on the surface, forming at least one resistive element on the surface between any two of the at least two transducer elements, and lapping the edge portion of the magnetic head cluster.

Depending on the design of the lapping processes, each cluster can contain one or more electrical lapping guides. Such lapping guides can be any combination of analog and/or digital "switch" types that are well-known in the field.

In accordance with the present invention, the size of electrical lapping guides can be reduced and the electrical lapping guides can be positioned between the transducers so that the size of the magnetic head cluster can be reduced to its functional size. As a result, the total number of clusters that can be produced on a wafer is increased.

BRIEF DESCRIPTION OF THE DRAWINGS

The present invention is illustrated by way of example and not limited in the figures of the accompanying drawings, in which like reference numbers indicate similar parts:

FIG. 5 is a plan view of a magnetic head cluster in accordance with the present invention; and FIG. 6 is a plan view of a lapping process in accordance with the present invention.

DETAILED DESCRIPTION OF THE INVENTION

Figure 1:
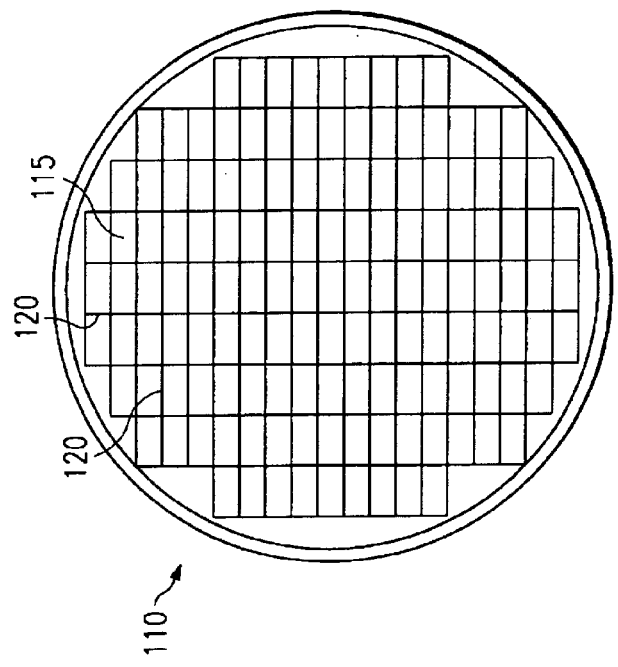
FIG. 1 is a plan view of a wafer containing a plurality of conventional magnetic head clusters formed in rows and columns.

FIG. 5 shows a preferred embodiment of the present invention. A magnetic head cluster 315 of the present invention includes a plurality of inner merged MR read/inductive write transducers 300 and outermost merged MR read/inductive write transducers 305, a plurality of electrical lapping guides 375, and a plurality of terminals 307 formed on a substrate 410. The substrate 410 can be a portion of a wafer (not shown) formed from any material which has high wear resistance, strength, fracture toughness, and good electrical conductivity, such as an alumina titanium-carbide (Al$_2$O$_3$/TiC) ceramic wafer. The transducers 300 and 305, lapping guides 375, and terminals 307 can be formed on the substrate 410 by any of the known transducer-forming processes.

The transducers 300 and 305 are preferably MR read and inductive write transducers as discussed above, and can include any combination of AMR, GMR, and spin valve read heads. The electrical lapping guides 375 may be composed of any type of electrically resistive material, including any combination of analog and/or digital switch types that are well-known in the art. The terminals 307 can be composed of any type of electrically conductive material, such as plated gold, suitable for transferring electrical signals between the transducers 300 and 305 and an external interface (not shown).

Figure 2:
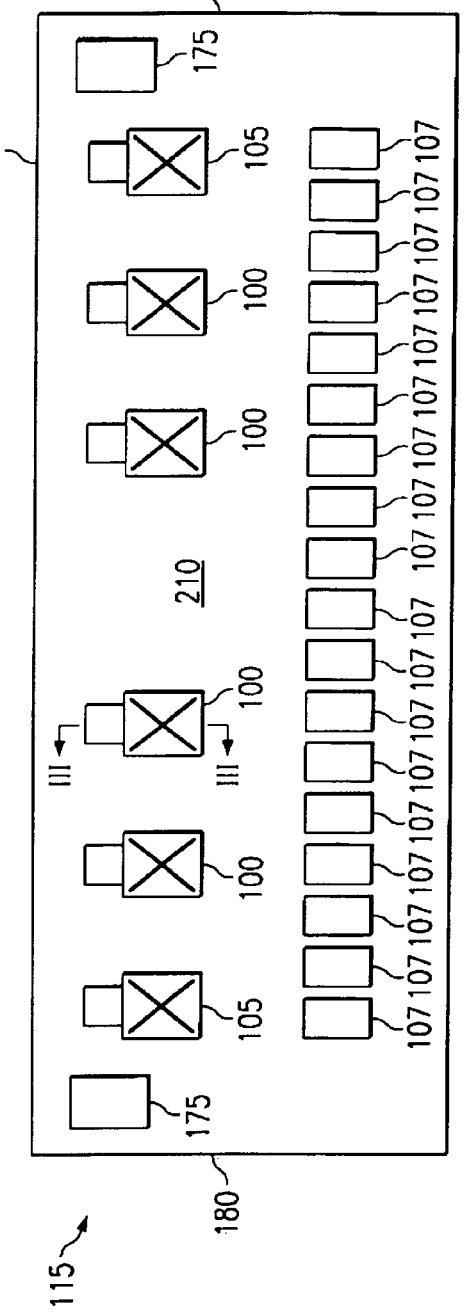
FIG. 2 is a plan view of a conventional magnetic head cluster.

As shown in FIG. 5, the electrical lapping guides 375 are each provided between adjacent inner transducers 300 and/or between adjacent inner transducers 300 and outermost transducers 305. In other words, in this preferred embodiment, there are no lapping guides 375 provided between an outermost transducer 305 and an adjacent outer edge 380 of the cluster 315. Compared to the conventional magnetic head cluster 115 shown in FIG. 2, the magnetic head cluster 315 is reduced in size since an excess amount of the substrate 410 is not required to accommodate electrical lapping guides 375 beyond the outermost transducers 305. Thus, the cluster 315 is reduced to its actual functional size, allowing for more clusters 315 to be formed on a wafer.

Figures 3, 4:
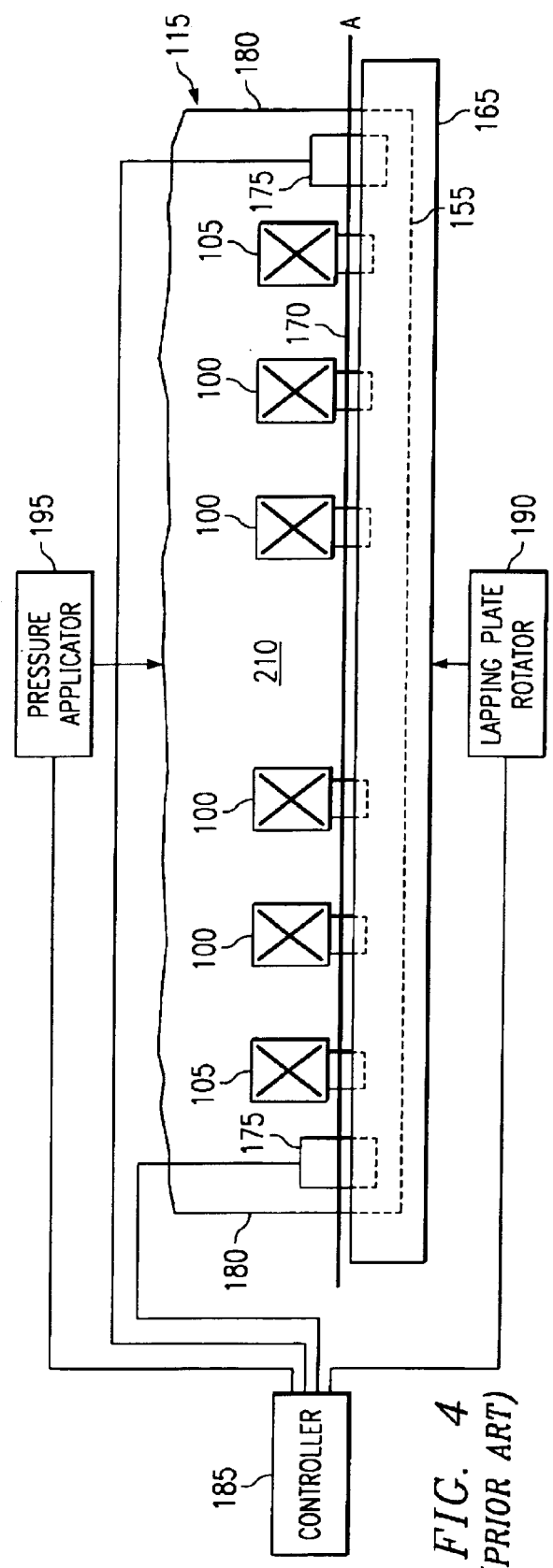
FIG. 3 is a cross sectional view of a magnetoresistive (MR) read and inductive write transducer 100 taken along line III—III of FIG. 2.
FIG. 4 is a plan view of a lapping system for a conventional cluster.

The transducers 300 and 305 included in the cluster 315 are preferably merged inductive write and MR read transducers. The transducers 300 and 305 can have the same configuration as the conventional transducer 100, which is shown in FIG. 3. As shown in FIG. 3, an MR read transducer 125 includes an MR stripe 130, which experiences variations in resistance when exposed to a magnetic field. The stripe height SH of the MR stripe 130 must be controlled within a tight tolerance, such as within a few micro-inches, so that a sensed magnetic signal can generate an optimum change in a resistance of the MR stripe 130. The inductive write transducer 135 comprises various layers of poles 140, and insulating material 145, and also includes an electrical coil 150. The region of the inductive write transducer 135 closest to an upper edge 355 of the cluster 315, where the two poles are separated only by a thin insulating layer, is typically called a throat 160. As will be explained later, the region closest to the upper edge 355 will eventually be lapped to form a tape bearing surface. As is known in the art, the throat height TH must also be controlled within a similarly tight tolerance for the transducer to generate an optimum magnetic signal.

FIG. 6 shows an exaggerated view of a lapping process in accordance with the present invention in order to provide a clear illustration. The broken line in FIG. 6 represents a portion of the cluster 315 which has already been removed by the lapping process. In FIG. 6, a controller 385 operates to activate and halt a lapping plate rotator 390. The lapping plate rotator 390, when activated, causes the lapping plate 365 to rotate relative to the cluster 315, thereby grinding the upper edge 355. Eventually, a sufficient amount of upper edge 355 is ground away to form a tape bearing surface 370. The tape bearing surface 370 is a surface of the magnetic head cluster 315 which will face a recording medium (not shown) when the magnetic head cluster 315 is used for read/write operations. A lapping plate pressure applicator 395 also receives signals from the controller 385 for continuously adjusting the amount of pressure being applied to the cluster 315 during the lapping process. The lapping plate pressure applicator 395 may include, for example, one or more dual action air cylinders (not shown) for applying varying amounts of pressure to different points on the cluster 315 in order to provide for skew control. The controller 385 senses an electrical resistance of the electrical lapping guides 375, which changes as portions of the electrical lapping guides 375 adjoining the upper edge 355 are lapped away. The lapping process is complete once the portions of the cluster 315 are removed up to line A, which indicates the desired position of a tape bearing surface 370 of the cluster 315.

During the lapping process, an excess portion of substrate 410 is carefully ground away from the magnetic head cluster 315 by introducing an abrasive material, such as a diamond slurry (not shown), between a lapping plate 365 and an upper edge 355 of the cluster 315. In order to provide for precise control during the lapping process, a plurality of electrical lapping guides 375 are provided between selected ones of the plurality of transducers 300 and 305. Once the electrical lapping guides 375 reach a predetermined resistance, the controller 385 halts the motion of the lapping plate 365. Ideally, the predetermined resistance is selected so that the target stripe height SH and throat height TH are achieved.

Although the present invention has been fully described by way of preferred embodiments and methods, one skilled in the art will appreciate that other embodiments and methods are possible without departing from the spirit and scope of the present invention.

What is claimed is:

1. A magnetic head cluster comprising:
    a substrate;
    a plurality of transducer elements disposed on a surface of the substrate; and
    at least one resistive element disposed on the surface of the substrate,
    wherein each one of the at least one resistive element is disposed between two of the plurality transducer elements;
    wherein said plurality of transducer elements is positioned between a first edge of the substrate and a second edge of the substrate, the second edge opposing the first edge; and
    wherein the plurality of transducer elements includes a first transducer and a last transducer, the first transducer having no resistive element positioned between the first transducer and the first edge and the last transducer having no resistive element positioned between the last transducer and the second edge.

2. A magnetic head cluster in accordance with claim 1, wherein at least one of the plurality of transducer elements includes a magnetoresistive read head and an inductive magnetic write head.

3. A magnetic head cluster in accordance with claim 2, wherein at least one of the plurality of resistive elements is an analog switch lapping guide.

4. A magnetic head cluster in accordance with claim 3, wherein at least one of the plurality of resistive elements is a digital switch lapping guide.

5. A magnetic bead cluster in accordance with claim 2, wherein at least one of the plurality of resistive elements is a digital switch lapping guide.

6. A magnetic head cluster in accordance with claim 2, further comprising at least one terminal disposed on the surface of the substrate.

7. A magnetic head cluster in accordance with claim 2, wherein at least one of the plurality of transducer elements includes a read head selected from a group consisting of anisotropic magnetoresistive read heads, giant magnetoresistive read heads, and spin valve read heads.

8. A magnetic head cluster comprising:
    a substrate having a surface and a plurality of edge portions;
    at least two transducer elements disposed on the surface of the substrate, each of the at least two transducer elements being adjacent to at least one of the plurality of edge portions; and
    at least one resistive element for assisting in the fabrication of the magnetic head cluster and disposed on the surface of the substrate,
    wherein no resistive elements are positioned between any one of the at least two transducer elements and a respective adjacent edge portion.

9. A magnetic head cluster in accordance with claim 8, wherein at least one of the at least two transducer elements includes a read head selected from a group consisting of anisotropic magnetoresistive read heads, giant magnetoresistive read heads, and spin valve read heads.

10. A magnetic head cluster in accordance with claim 9, wherein at least one of the plurality of resistive elements is selected from a group consisting of analog switch lapping guides and digital switch lapping guides.

11. A magnetic head cluster in accordance with claim 10, further comprising at least one terminal disposed on the surface of the substrate.

12. A magnetic head cluster in accordance with claim 8, wherein at least one of the at least two transducer elements includes a magnetoresistive read head and an inductive magnetic write head.

13. A method of fabricating a magnetic head cluster comprising the steps of:

providing a substrate having a surface and a plurality of edge portions;

forming at least two transducer elements on the surface of the substrate; and forming at least one resistive element, for assisting in the fabrication of the magnetic head cluster on the surface of the substrate between two of the at least two transducer element, wherein no resistive element is positioned between any one of the at least two transducer elements and a respective adjacent edge portion—has been inserted after "two transducer elements".

14. A method of fabricating a magnetic head cluster in accordance with claim 13, further comprising the step lapping an edge portion of the magnetic head cluster.

15. A method of fabricating a magnetic head cluster in accordance with claim 14, further comprising the step of measuring the resistance of the at least one resistive element.

16. A method of fabricating a magnetic head cluster in accordance with claim 15, wherein the step of measuring the resistance is performed during the step of lapping, and wherein the step of lapping is performed until the resistance of at least one of the resistive elements reaches a specified resistance.

17. A method of fabricating a magnetic head cluster in accordance with claim 14, further comprising a plurality of resistive elements, and wherein each of the plurality of resistive elements is formed on the surface of the substrate between two of the at least two transducer elements.

18. A method of fabricating a magnetic head cluster in accordance with claim 17, further comprising the step of measuring the resistance of at least one of the plurality of resistive elements.

19. A method of fabricating a magnetic head cluster in accordance with claim 18, wherein the step of measuring the resistance is performed during the step of lapping, and wherein the step of lapping is performed until the resistance of at least one of the resistive elements reaches a predetermined resistance.

20. A method of fabricating a magnetic head cluster in accordance with claim 14, wherein at least one of the plurality of resistive elements is selected from a group consisting of analog switch lapping guides and digital switch lapping guides.

* * * * *

UNITED STATES PATENT AND TRADEMARK OFFICE
CERTIFICATE OF CORRECTION

PATENT NO. : 6,950,289 B2
DATED : September 27, 2005
INVENTOR(S) : Lam et al.

It is certified that error appears in the above-identified patent and that said Letters Patent is hereby corrected as shown below:

Column 7,
Line 13, delete "cluster" and insert -- cluster, --.
Line 15, delete "element," and insert -- elements, --.
Lines 17-18, delete "elements and a respective adjacent edge portion - has been inserted after "two transducer elements"." and insert -- elements and a respective adjacent edge portion. --.

Signed and Sealed this

Tenth Day of January, 2006

JON W. DUDAS
*Director of the United States Patent and Trademark Office*